(12) United States Patent
Campbell

(10) Patent No.: US 8,062,576 B2
(45) Date of Patent: Nov. 22, 2011

(54) METHOD OF MOLDING A UNITARY OBJECT

(75) Inventor: Adam J. Campbell, Bentleigh (AU)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/651,704

(22) Filed: Jan. 4, 2010

(65) Prior Publication Data

US 2011/0163572 A1     Jul. 7, 2011

(51) Int. Cl.
*B29C 49/20* (2006.01)
(52) U.S. Cl. .................... 264/516; 264/250
(58) Field of Classification Search .......... 264/328.1, 264/515, 516, 250
See application file for complete search history.

(56) References Cited

U.S. PATENT DOCUMENTS

| | | | | |
|---|---|---|---|---|
| 5,931,525 | A * | 8/1999 | Rickabus | 296/214 |
| 5,996,824 | A * | 12/1999 | Grant et al. | 215/2 |
| 7,252,324 | B1 * | 8/2007 | Nahm et al. | 296/180.1 |
| 7,311,351 | B1 * | 12/2007 | Nahm et al. | 296/180.1 |
| 7,328,480 | B2 * | 2/2008 | Schoemann | 16/225 |
| 7,364,330 | B2 * | 4/2008 | Nahm et al. | 362/496 |
| 7,422,269 | B2 * | 9/2008 | Nahm et al. | 296/180.1 |
| 2007/0085361 | A1 * | 4/2007 | Hauser | 296/1.08 |
| 2008/0023985 | A1 | 1/2008 | Nahm et al. | |
| 2008/0185863 | A1 * | 8/2008 | Kamano et al. | 296/70 |

* cited by examiner

*Primary Examiner* — Jill Heitbrink
(74) *Attorney, Agent, or Firm* — Quinn Law Group, PLLC

(57) ABSTRACT

A method for producing a moldable object having a hollow plastic component and a single-piece plastic stanchion is provided. The method includes molding the single-piece plastic stanchion in a first mold. The molded stanchion includes a first substantially-closed end and a second substantially-open end, and a cap joined with the second end via a living-hinge, enabling the cap to assume and maintain a position, such that the second end becomes substantially covered. The method also includes flexing the living-hinge, wherein the cap assumes and maintains the position such that the second end is substantially covered. The method additionally includes arranging the single-piece stanchion relative to a second mold after the second end is substantially-covered via the cap. Furthermore, the method includes molding the hollow plastic component in the second mold, such that the single-piece stanchion is fixedly retained by the hollow plastic component.

13 Claims, 5 Drawing Sheets

METHOD OF MOLDING A UNITARY OBJECT

TECHNICAL FIELD

The invention relates to molded features or components, and, more particularly, to a unitary construction of such a molded feature.

BACKGROUND OF THE INVENTION

Various objects may be manufactured via molding processes. Molding is often employed to produce objects from various polymers and other types of plastic materials. Common molding processes include blow molding and injection molding.

Blow molding and injection molding both typically employ heated thermoplastic materials to conform to a shape created in a specially designed tool, or mold cavity. Blow molding is generally employed to produce hollow objects of relatively simple shape with loosely controlled thickness. Injection molding, on the other hand, is generally employed to produce objects of more complex shape, and is frequently employed where an object with more precise dimensional control is required.

SUMMARY OF THE INVENTION

A method is provided for producing a molded object having a hollow plastic component and a single-piece plastic stanchion. The method includes molding the single-piece plastic stanchion in a first mold according to a first molding process. The molded stanchion includes a first substantially-closed end and a second substantially-open end, and a cap joined with the second end via a living-hinge, that is a thin flexible hinge that joins together two rigid parts. The living-hinge enables the cap to assume and maintain a position, such that the second end becomes substantially covered.

The method also includes flexing the living-hinge, wherein the cap assumes and maintains the position such that the second end is substantially covered. The method additionally includes arranging the single-piece stanchion relative to a second mold after the second end is substantially-covered via the cap. Furthermore, the method includes molding the hollow plastic component in the second mold according to a second molding process, such that the single-piece stanchion is fixedly retained by the hollow plastic component.

According to the method, the first molding process may be injection-molding, while the second molding process may be blow-molding. The single-piece stanchion and the hollow plastic component may each be configured from a thermoplastic plastic material.

The cap may include a locking element configured to enable the cap to maintain the position wherein the second end becomes substantially covered. The stanchion may further include a protrusion arranged proximate to the second end and configured to generate an interference fit with the locking element to enable the cap to maintain the position wherein the second end becomes substantially covered.

According to one embodiment, the above method may be applied to manufacture a plastic spoiler for attachment to a body of a vehicle.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
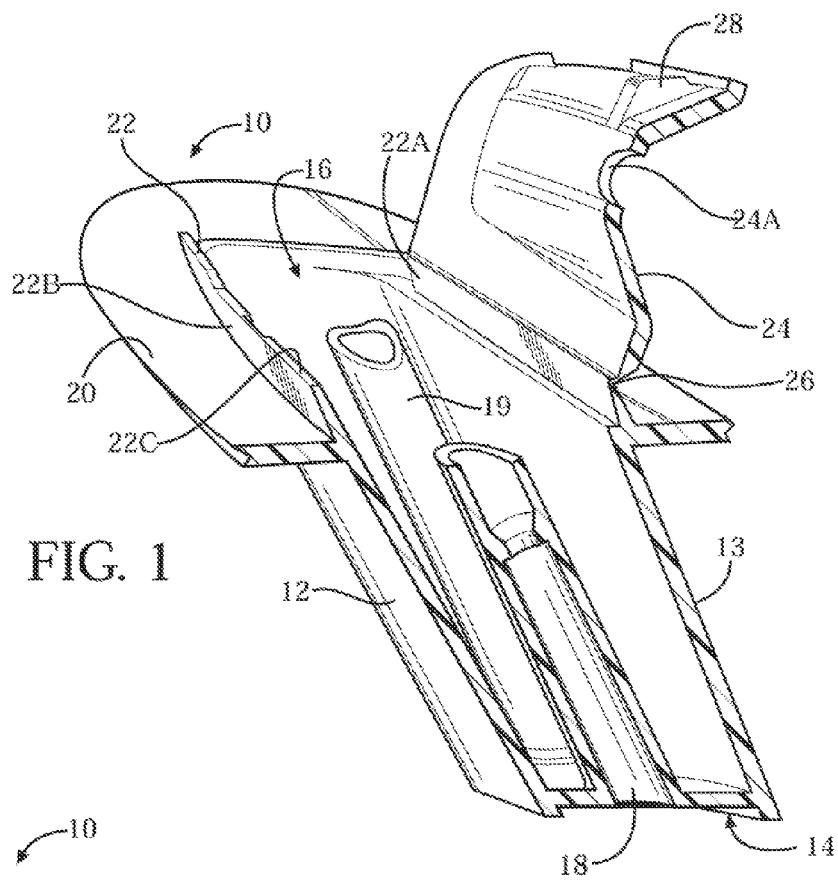
FIG. 1 is a perspective cross-sectional view of a single-piece stanchion having a cap joined with the stanchion by a living-hinge, shown in an uncovered state.

Referring to the drawings, wherein like reference numbers refer to like components, FIG. 1 shows a cross-sectional view of a stanchion 10. As to be further explained with respect to the included figures, stanchion 10 may be employed as a support leg and an attachment feature for an aerodynamic and cosmetic aid, such as a wing or a spoiler, as commonly utilized on motor vehicles (not shown). Such aerodynamic aids and/or cosmetic accessories are typically designed to be attached to vehicle body panels in a fixed and rigid manner to facilitate reliable performance of their function.

Stanchion 10 is a plastic molded part, preferably formed via an injection-molding process in a specifically designed injection-molding tool (not shown), and is preferably configured from a thermoplastic plastic material, such as Acrylonitrile Butadiene Styrene (ABS), as known by those skilled in the art. Stanchion 10 includes an elongated body 12 having a first, substantially-closed end 14 and a second, substantially-open end 16. The elongated body 12 is configured as a deep cavity 13 of substantially uniform wall thickness, which assures desired structural integrity of the stanchion despite such considerable depth. The first end 14 includes a first hollow post 18 configured to add rigidity to the stanchion 10, as will be described below in greater detail with respect to FIG. 1A. Furthermore, the first end 14 preferably includes at least one second post 19 configured to accept a fastener (not shown) for attaching the stanchion 10 to a body panel or some other feature of a vehicle, as understood by those skilled in the art.

The second end 16 includes a flange 20, which extends all the way around the perimeter of the substantially-open second end 16, and a band 22, which also extends all the way around the perimeter of the second end, orthogonally relative to the flange. A cap 24 is joined to the second end 16 at a localized area 22A of band 22 via a living-hinge 26. As understood by those skilled in the art, a living-hinge is a thin flexible hinge that joins together two rigid plastic parts. A living-hinge is molded simultaneously with the two other parts as a single unitary piece, permitting those two parts to bend relative to each other along the line of the hinge. In the present embodiment, the living-hinge 26 joins the body 12 and the cap 24, thus permitting the cap to bend relative to the body for covering the second end 16.

Figure 1A:
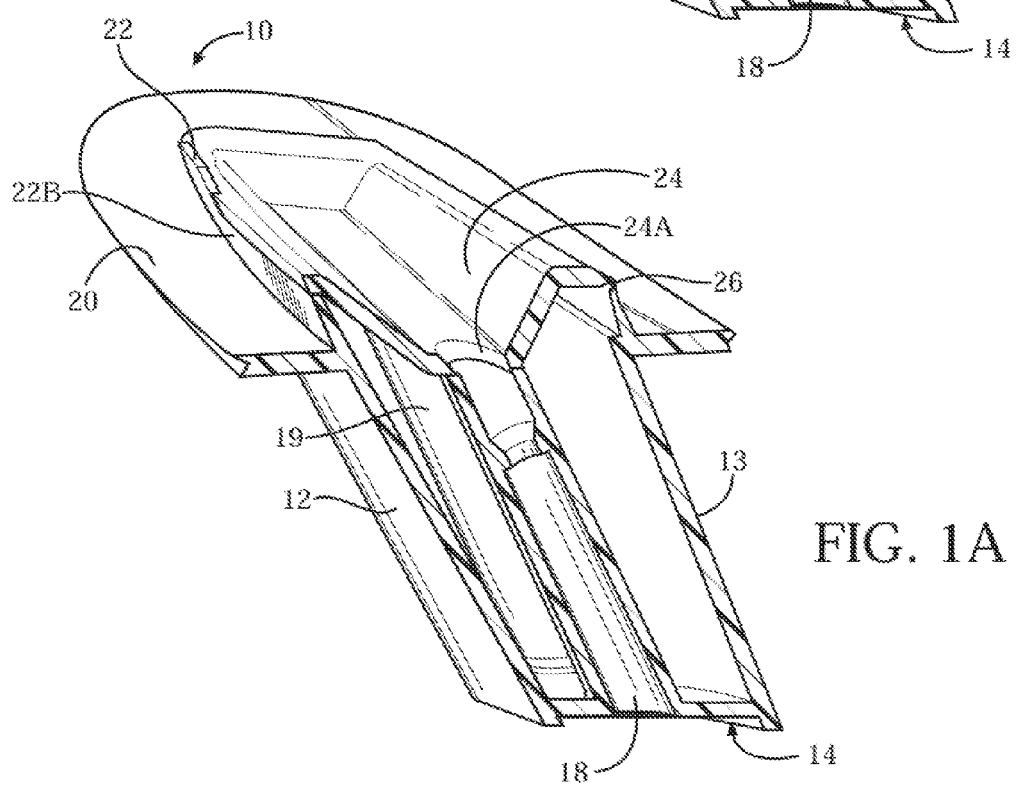
FIG. 1A is a perspective cross-sectional view of the single-piece stanchion illustrated in FIG. 1, shown in a covered state.

The cap 24 includes an extension 28 which functions as a locking element when the cap is bent around the living-hinge 26 and is brought into contact with the band 22. Extension 28 permits cap 24 to assume and maintain a position in which second end 16 becomes substantially covered via the cap, as shown in FIG. 1A. The position of the cap 24 where second end 16 is substantially covered may be maintained by an interference fit between extension 28 and localized area 22B of band 22. Furthermore, an additional locking feature may be included, such as a protrusion 22C molded into area 22B at the point or line of contact between the cap 24 and the area 22B, to likewise generate an interference fit, and for the extension 28 to be pushed past. An additional locking feature, such as protrusion 22C, would facilitate to further secure the cap in its bent position, as understood by those skilled in the art. Posts 18 and 19 incorporated into first end 14 are positioned and sized to support cap 24 when the cap is in the position in which the second end 16 is substantially covered, thereby adding rigidity to the stanchion 10. As shown in FIG. 1A, the interior of the hollow post 18 coincides with an opening 24A in the cap 24 when the second end 16 becomes substantially covered by the cap.

Figure 2:
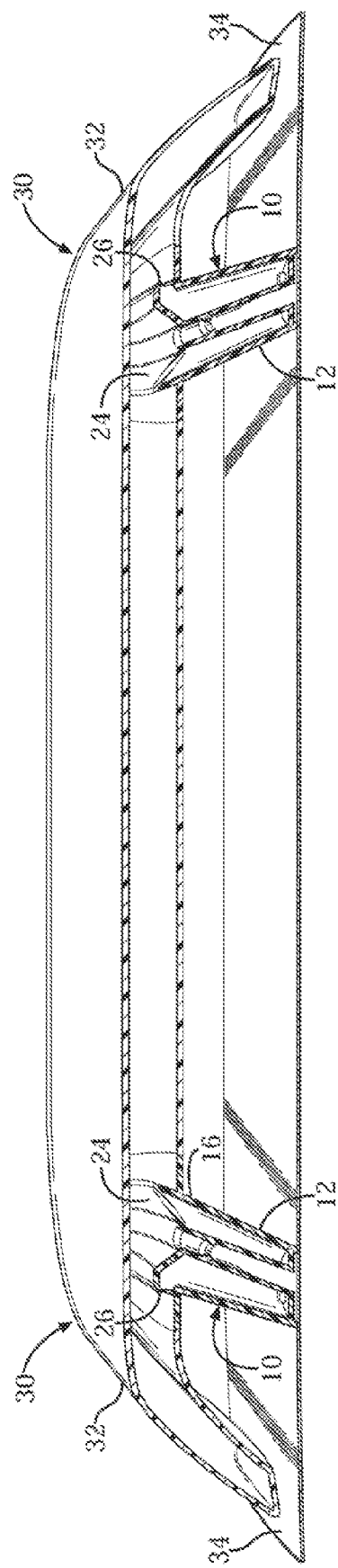
FIG. 2 is a perspective cross-sectional view of a spoiler assembly including a pair of single-piece stanchions in a covered state fixedly retained by a spanning hollow component.

FIG. 2 depicts a cross-sectional view of a vehicle spoiler assembly 30, which includes a pair of single-piece stanchions 10. In FIG. 2, the stanchions 10 are illustrated in a covered state, i.e., having their caps 24 bent on their respective living-hinges 26, thereby substantially covering their second ends 16. Stanchions 10 are fixedly retained by a spanning wing 32. Wing 32 is a hollow plastic component preferably produced via a blow-molding process in a specifically designed blow-molding tool (not shown) from a thermoplastic plastic material as known by those skilled in the art. The spoiler assembly 30 is shown in fixed connection with a surface 34 of a vehicle body. Such a fixed connection may be made via threaded fasteners (not shown), such as separate screws or studs molded into the body 12, as understood by those skilled in the art.

Spoiler assembly 30 is created by initially arranging each stanchion 10 having its second end 16 substantially covered by cap 24, relative to and in such proximity to the blow-molding tool, so that the subsequently blow-molded wing 32 captures and retains the stanchion. The coverage of second end 16 by cap 24 is intended to block-off the interior of the elongated body 12 during the molding of wing 32. Thus, such coverage by cap 24 directs the plastic material injected into the blow-molding tool to generate a continuously shaped wing with substantially uniform thickness, particularly where the wing 32 is molded around the stanchions 10. Consequently, spoiler assembly 30 includes stanchions 10 integrally fused or welded with wing 32, such that the spoiler assembly 30 is a unitary object that is ready to be attached to a receiving surface, such as a body panel of a vehicle.

Figure 3:
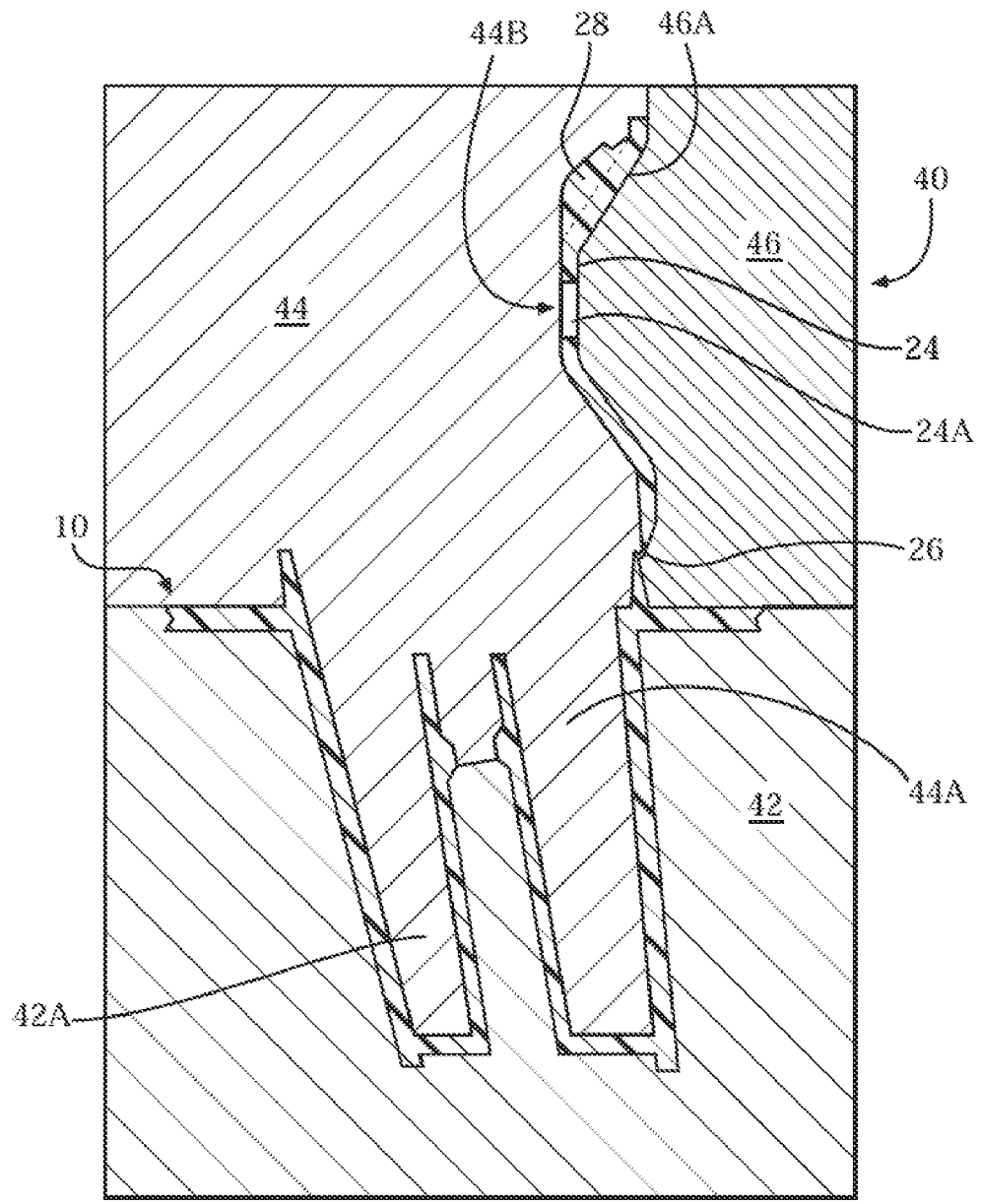
FIG. 3 is a cross-sectional plan view of a first mold employed for producing the single-piece stanchion illustrated in FIG. 1.

FIG. 3 illustrates a cross-sectional plan view of a first mold 40, such as for an injection-molding process employed for producing the stanchion 10. The first mold 40 has a bottom section 42 which includes an internal cavity 42A. Internal cavity 42A reflects the exterior shape of body 12, post 18 and flange 20 of the stanchion 10. The first mold 40 also has an upper section 44 that includes an external shape 44A and an internal shape 44B. External shape 44A reflects the interior shape of the body 12, post 18 and flange 20 of the stanchion 10. Internal shape 44B reflects one side of the living-hinge 26 together with the side of the cap 24 that includes extension 28. The first mold 40 additionally includes a side section 46 that includes an external shape 46A. External shape 46A reflects the second side of the living-hinge 26 and the second side of the cap 24 that is devoid of extension 28. Molten plastic material is introduced into the cavity formed subsequent to the sections 42, 44 and 46 being brought together, following which the plastic material is allowed to cool and solidify, thereby forming the stanchion 10.

Figure 3A:
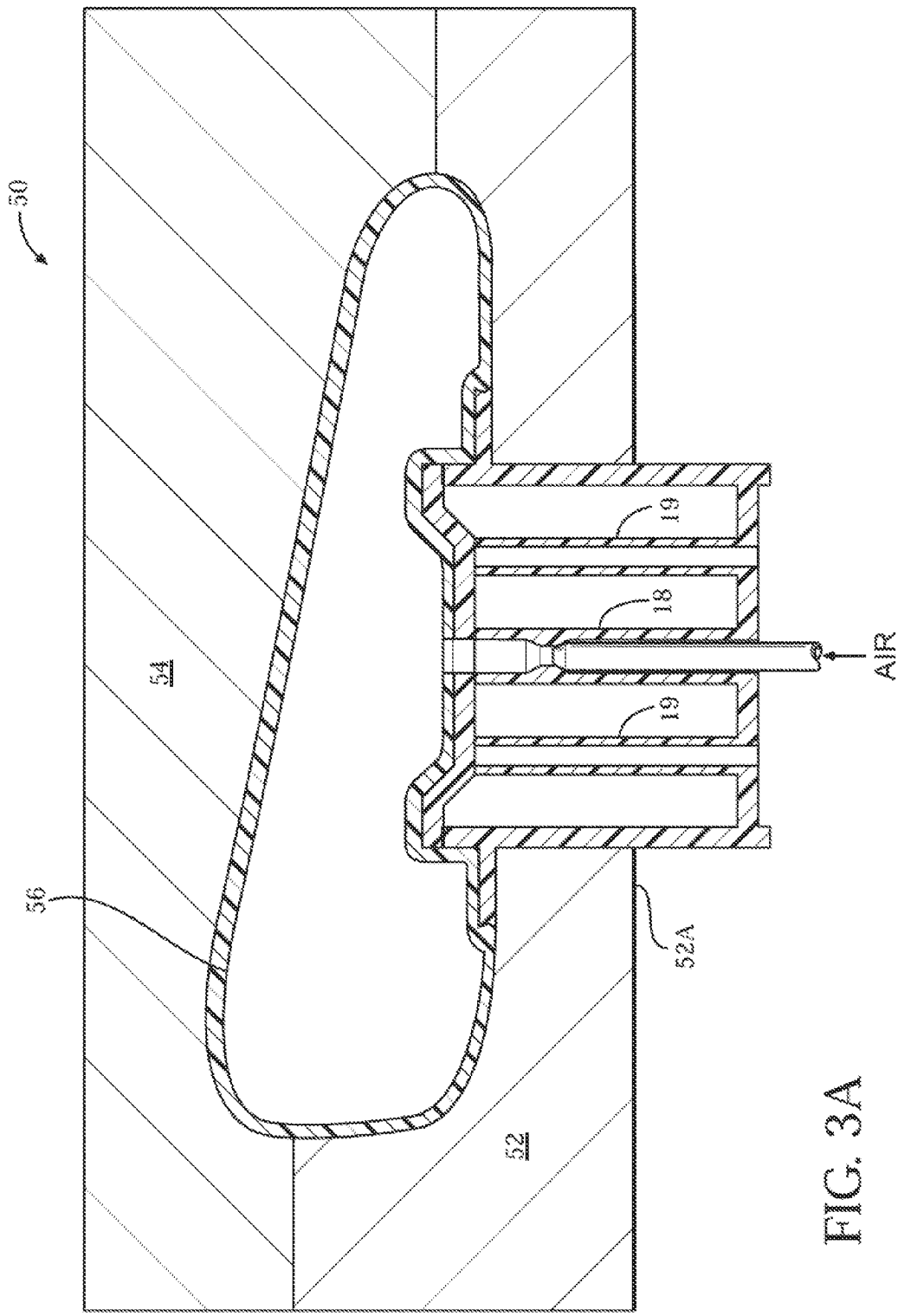
FIG. 3A is a cross-sectional plan view of a second mold employed for producing the spoiler assembly illustrated in FIG. 2.

FIG. 3A illustrates a cross-sectional plan view of a second mold 50, such as for a blow-molding process employed for producing the spoiler assembly 30. Although only one stanchion 10 is shown in FIG. 2A, it is to be understood that the mold 50 includes provisions to accept multiple stanchions 10. The second mold 50 has a bottom section 52 and a top section 54, which when brought together form a cavity 56 that reflects the exterior shape of the wing 32. The bottom section 52 includes opening 52A for accepting stanchion 10 with second end 16 covered by cap 24, such that flange 20 blocks the opening 52A, and the band 22 protrudes into the cavity 56.

Compressed air is introduced into cavity 56 through the interior of the hollow post 18 and via the opening 24A subsequent to molten thermoplastic material, preferably in the form of a tube, being introduced therein. The compressed air is blown into cavity 56 in order to inflate the molten material, and force the material to conform to the interior walls of the cavity and the exterior shape of flange 20, band 22, and cap 24. After the molten thermoplastic material in the cavity 56 has sufficiently cooled, the second mold section 52 and 54 are separated, and spoiler assembly 30 having wing 32 integrally fused with one or more stanchions 10 is removed.

Figure 4:
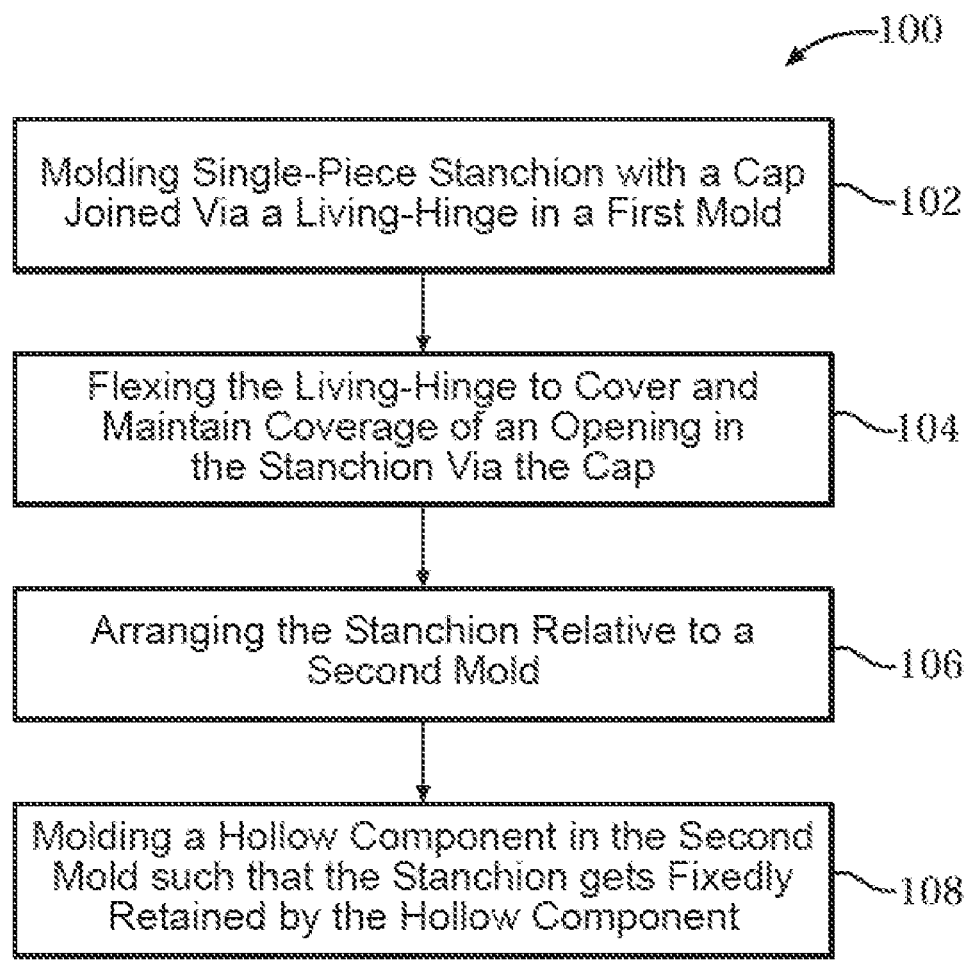
FIG. 4 is a flow chart illustrating a method of producing the assembly illustrated in FIG. 2.

A method 100 for producing a moldable object is shown in FIG. 4, and is described below with respect to spoiler assembly 30 described with respect to FIGS. 1-3A. In frame 102 the method provides molding the single-piece stanchion 10 having cap 24 and band 22 joined via living-hinge 26. The single-piece stanchion 10 is preferably molded via the injection-molding process in first mold 40, described above with respect to FIG. 2. From frame 102, the method proceeds to frame 104, where the living-hinge 26 is flexed, such that cap 24 substantially covers and maintains the coverage of the otherwise substantially-open second end 16.

After the live-hinge 26 is flexed and the second opening 16 is covered, according to the method, the stanchion 10 is arranged relative to the second mold 50 in frame 106, as described above relative to FIG. 2A. Following frame 106, the method advances to frame 108, where a hollow component, such as wing 32, is molded in the second mold 50, thereby fixedly retaining the stanchion 10 by the hollow component. Thus, in the case of the spoiler assembly 30, the stanchion 10 becomes integrally fused with the wing 32.

While the best modes for carrying out the invention have been described in detail, those familiar with the art to which this invention relates will recognize various alternative designs and embodiments for practicing the invention within the scope of the appended claims.

The invention claimed is:

1. A method for producing a molded object having a hollow plastic component and a single-piece plastic stanchion, the method comprising:
   a) molding the single-piece stanchion in a first mold according to a first molding process, such that the single-piece stanchion includes a first substantially-closed end having a hollow post, a second substantially-open end, and a cap joined with the second end via a living-hinge, thereby enabling the cap to assume and maintain a position such that the second end becomes substantially covered, wherein the cap defines an opening that coincides with the hollow post when the second end becomes substantially covered by the cap;
   b) flexing the living-hinge, wherein the cap assumes and maintains the position such that the second end is substantially covered by the cap;

c) arranging the single-piece stanchion relative to a second mold after the second end is substantially-covered via the cap; and d) molding the hollow plastic component in the second mold according to a second molding process, such that the single-piece stanchion is fixedly retained by the hollow plastic component, wherein compressed air is introduced through the interior of the hollow post via the opening to mold the hollow plastic component.

2. The method of claim 1, wherein the first molding process is injection-molding.

3. The method of claim 1, wherein the second molding process is blow-molding.

4. The method of claim 1, wherein the single-piece stanchion is configured from a thermoplastic plastic material.

5. The method of claim 1, wherein the hollow plastic component is configured from a thermoplastic plastic material.

6. The method of claim 1, wherein the cap includes a locking element configured to enable the cap to maintain the position wherein the second end becomes substantially covered.

7. The method of claim 6, wherein the stanchion further includes a protrusion arranged proximate to the second end and configured to generate an interference fit with the locking element to enable the cap to maintain the position wherein the second end becomes substantially covered.

8. A method for producing a plastic spoiler for attachment to a vehicle body, the plastic spoiler having a hollow section and at least one single-piece stanchion, the method comprising:

a) molding the at least one single-piece stanchion in a first mold, such that the single-piece stanchion includes a first substantially-closed end having a hollow post and a second substantially-open end, and a cap joined with the second end via a living-hinge, enabling the cap to assume and maintain a position, such that the second end becomes substantially covered by the cap, wherein the cap defines an opening that coincides with the hollow post when the second end becomes substantially covered by the cap;

b) flexing the living-hinge, wherein the cap assumes and maintains the position such that the second end is substantially covered;

c) arranging the at least one single-piece stanchion relative to a second mold after the second end is substantially-covered via the cap; and d) molding the hollow section in the second mold such that the at least one single-piece plastic stanchion is fixedly retained by the hollow section, wherein compressed air is introduced through the interior of the hollow post via the opening to mold the hollow section.

9. The method of claim 8, wherein the at least one single-piece stanchion is molded via an injection-molding process, and the hollow section is molded via a blow-molding process.

10. The method of claim 8, wherein the single-piece stanchion is configured from a thermoplastic plastic material.

11. The method of claim 8, wherein the hollow plastic component is configured from a thermoplastic plastic material.

12. The method of claim 8, wherein the cap includes a locking element configured to enable the cap to maintain the position wherein the second end becomes substantially covered.

13. The method of claim 12, wherein the stanchion further includes a protrusion arranged proximate to the second end and configured to generate an interference fit with the locking element to enable the cap to maintain the position wherein the second end becomes substantially covered.

* * * * *